(12) United States Patent
Maeda et al.

(10) Patent No.: US 11,040,502 B2
(45) Date of Patent: Jun. 22, 2021

(54) METHOD FOR PRODUCING FIBER-REINFORCED RESIN MOLDED ARTICLES

(71) Applicant: MITSUBISHI HEAVY INDUSTRIES, LTD., Tokyo (JP)

(72) Inventors: Mitsutoshi Maeda, Tokyo (JP); Kazuma Takeno, Tokyo (JP); Hiroshi Tokutomi, Tokyo (JP); Tetsuya Sato, Tokyo (JP); Kazunori Kuga, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 252 days.

(21) Appl. No.: 16/324,503

(22) PCT Filed: Aug. 9, 2017

(86) PCT No.: PCT/JP2017/028939
§ 371 (c)(1),
(2) Date: Feb. 8, 2019

(87) PCT Pub. No.: WO2018/030470
PCT Pub. Date: Feb. 15, 2018

(65) Prior Publication Data
US 2019/0176412 A1 Jun. 13, 2019

(30) Foreign Application Priority Data
Aug. 9, 2016 (JP) .............................. JP2016-156185

(51) Int. Cl.
*B29C 70/48* (2006.01)
*B29C 43/12* (2006.01)
(Continued)

(52) U.S. Cl.
CPC .............. *B29C 70/48* (2013.01); *B29C 43/12* (2013.01); *B29C 43/3642* (2013.01);
(Continued)

(58) Field of Classification Search
None
See application file for complete search history.

(56) References Cited

U.S. PATENT DOCUMENTS 4,942,013 A * 7/1990 Palmer ................ B29C 43/3642
156/285
5,576,030 A * 11/1996 Hooper ................ B29C 70/443
264/257
(Continued)

FOREIGN PATENT DOCUMENTS

| JP | 2003-053851 A | 2/2003 |
| JP | 2004-181627 A | 7/2004 |

(Continued)

OTHER PUBLICATIONS

Notification of Reasons for Refusal issued in corresponding Japanese Patent Application No. 2018-533535, dated Feb. 12, 2020 (6 pages).
(Continued)

*Primary Examiner* — Edmund H Lee
(74) *Attorney, Agent, or Firm* — Osha Bergman Watanabe & Burton LLP

(57) ABSTRACT

A method for producing a fiber-reinforced resin molded article includes disposing a suction medium, a resin barrier aeration medium and a fiber base material in a cavity such that the suction medium is disposed between an end part of the fiber base material and a mold, and the resin barrier aeration medium is disposed between the suction medium and the end part of the fiber base material. The method further includes: impregnating the fiber base material with a
(Continued)

resin by injecting the resin from an injection part, while reducing a pressure in the cavity by suction from a suction part; curing the resin with which the fiber base material is impregnated; and releasing a fiber-reinforced resin in which the fiber base material and the resin are integrated.

14 Claims, 8 Drawing Sheets

(51) Int. Cl.
  *B29C 70/44*   (2006.01)
  *B29C 43/36*   (2006.01)
  *B29L 31/30*   (2006.01)

(52) U.S. Cl.
  CPC ...... *B29C 70/44* (2013.01); *B29C 2043/3644* (2013.01); *B29C 2043/3657* (2013.01); *B29L 2031/3076* (2013.01)

(56) References Cited

U.S. PATENT DOCUMENTS

| | | | |
|---|---|---|---|
| 5,968,445 A | 10/1999 | McCarville et al. | |
| 2002/0020934 A1* | 2/2002 | Hinz | B29C 70/548 |
| | | | 264/40.6 |
| 2004/0130072 A1 | 7/2004 | Sekido et al. | |
| 2006/0125155 A1* | 6/2006 | Sekido | B29C 70/548 |
| | | | 264/511 |
| 2012/0119405 A1 | 5/2012 | Weber et al. | |
| 2013/0175740 A1* | 7/2013 | Shinoda | B29C 70/443 |
| | | | 264/571 |
| 2018/0072005 A1* | 3/2018 | Gu | B29C 70/546 |

FOREIGN PATENT DOCUMENTS

| | | |
|---|---|---|
| JP | 2009-045924 A | 3/2009 |
| JP | 2012-045863 A | 3/2012 |
| JP | 2012-528024 A | 11/2012 |
| JP | 2012245623 A | 12/2012 |
| JP | 5138553 B2 | 2/2013 |
| JP | 5637780 B2 | 12/2014 |

OTHER PUBLICATIONS

International Preliminary Report in corresponding International Application No. PCT/JP2017/028939, dated Feb. 21, 2019 (2 pages).
International Search Report and Written Opinion in corresponding International Application No. PCT/JP2017/028939, dated Sep. 5, 2017 (12 pages).

* cited by examiner

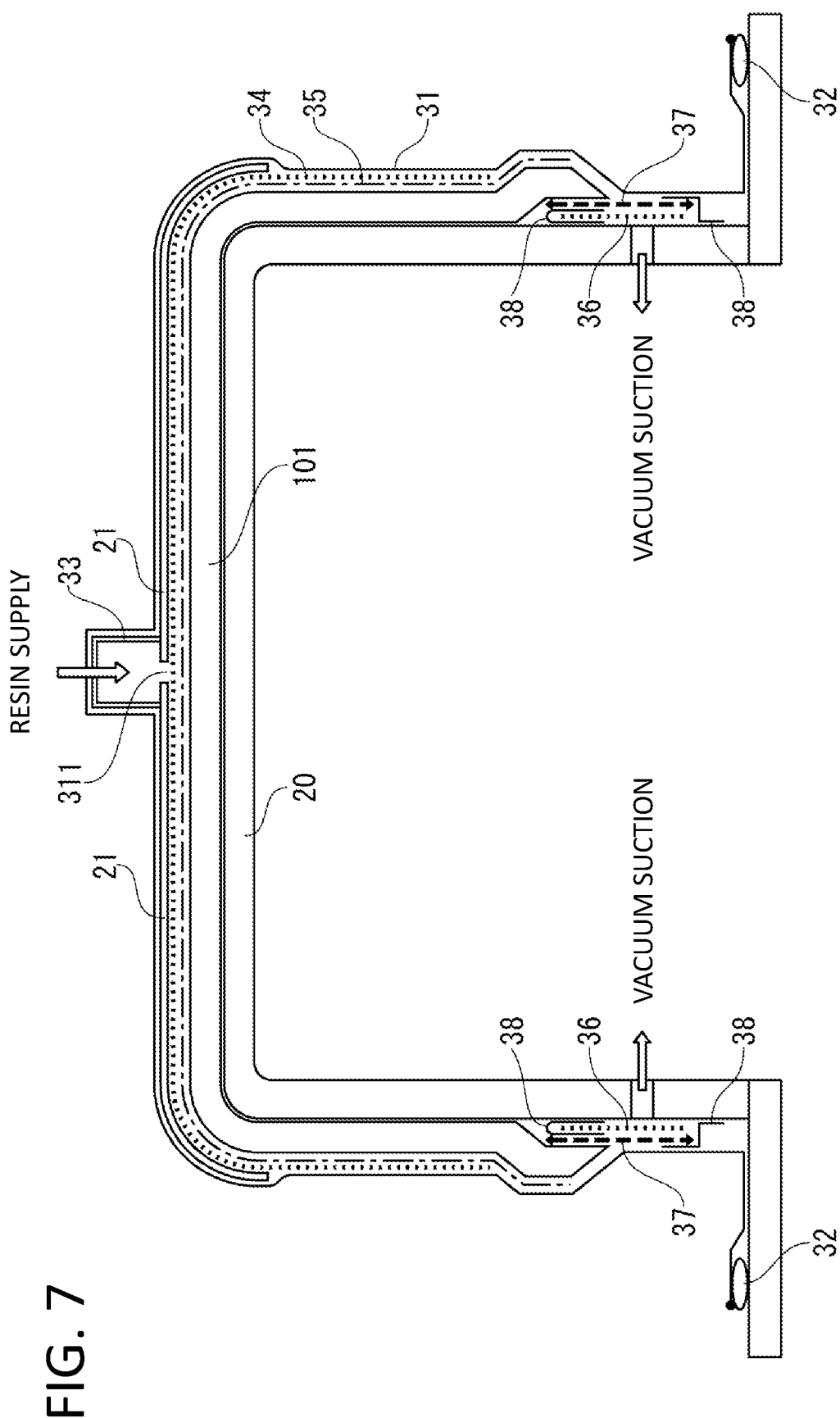

METHOD FOR PRODUCING FIBER-REINFORCED RESIN MOLDED ARTICLES

TECHNICAL FIELD

The present invention relates to a production method for obtaining a molded article from a fiber-reinforced resin (composite material). Particularly, the present invention relates to a molding method using a VaRTM (Vacuum assisted Resin Transfer Molding) method of impregnating a fiber base material with a resin by injecting the resin into a pressure reduction space in which the fiber base material is disposed.

BACKGROUND ART

Use of molded articles composed of a fiber-reinforced resin having a specific strength has expanded. As a production method for obtaining a molded article composed of the fiber-reinforced resin, VaRTM allowing cost reduction compared to a technique of using a prepreg and an autoclave in the related art has been widely used.

In the VaRTM method, a fiber base material is disposed in a mold and is covered with a bag film, and the pressure in a cavity formed between the bag film and the mold is reduced. Thereby, a resin is injected into the cavity by the pressure difference between the interior of the cavity and the atmosphere, so that the fiber base material is impregnated with the resin (for example, Patent Literature 1).

In the VaRTM method, it is important to impregnate the whole of the fiber base material with the resin injected into the cavity, in order to uniformly impregnate the fiber base material with the resin and obtain a fiber-reinforced resin molded article having a stable quality.

In Patent Literature 1 in which a tabular member is molded, in a configuration in which the resin is injected from one end side of the fiber base material and the interior of the cavity is degassed from the other end side of the fiber base material, the fiber base material is covered with a breather (resin dispersion medium), and spiral tubes are disposed on an injection side and degassing side of the breather, respectively. Furthermore, a degassing bag with which a vacuum pump is connected is disposed just under the spiral tube on the degassing side. The degassing bag includes a breather, a degassing tube with which a suction nozzle is connected, and a bag body that is formed of a waterproof moisture-permeable cloth that encloses the breather and the degassing tube.

In Patent Literature 1, the resin injected into the cavity is dispersed over the whole of the fiber base material, by the spiral tube on the injection side and the breather, and is led to the spiral tube on the degassing side. At a distal end of the spiral tube on the degassing side, only gas is discharged by the action of the bag body to prevent voids from being generated in the fiber-reinforced resin.

CITATION LIST

Patent Literature

Patent Literature 1: JP 2012-45863 A

SUMMARY OF INVENTION

Technical Problem

In the case of molding a tabular member as described in Patent Literature 1, the injected resin spreads on a plane, and therefore, the resin easily reaches an end part of the fiber base material that is away from the injection spot. However, depending on the shape of a member such as a bent member, the resin is less likely to easily flow to the end part of the fiber base material that is away from the injection spot. In that case, there is a concern that a non-impregnated region that is not impregnated with the resin is generated at the end part of the member.

The present invention has an object to provide a method for producing a fiber-reinforced resin molded article that allows the reduction in the risk of the non-impregnation.

Solution to Problem

The inventors of the present invention has diligently studied the method that allows the reduction in the risk of the non-impregnation, including an example shown in FIG. 8A and FIG. 8B.

FIG. 8A shows an example in which a member having a cross-sectional nearly C-shape is molded. This member is a long member that extends in a direction orthogonal to the sheet plane.

In this example, within a concave part of a mold 41, a fiber base material 42 is disposed in a cross-sectional C-shape, and further, plates 431, 431 and plates 432, 432 that press the fiber base material 42 to the mold 41 are disposed.

An injection channel for injecting the resin is provided along the longitudinal direction at a center part in the width direction of the fiber base material 42, such that the whole of the fiber base material 42 is impregnated with the resin. Then, the suction is performed from both end parts 42A, 42A in the width direction of the fiber base material 42. A suction medium 46 that communicates with an unillustrated suction part is disposed on the back side of the end part 42A.

In the example shown in FIG. 8A, when the resin in a liquid form is supplied from one end side of the injection channel 44 into the injection channel 44 under a reduced pressure due to the suction from the end parts 42A, 42A of the fiber base material 42, the resin flows through the injection channel 44 in the length direction of the fiber base material 42, and is injected from the injection channel 44 to a pressure reduction space. Furthermore, the resin is dispersed by a medium 45 as shown in FIG. 8B, and therewith, flows also in the thickness direction of the fiber base material 42. Solid arrows schematically show the flow of the resin that is injected from the injection channel 44.

Here, as shown by dashed arrows in FIG. 8B, when the resin enters the suction medium 46 disposed at the end part 42A, the resin easily flows in the length direction of the fiber base material 42, through the suction medium 46, in which the flow resistance of the resin is lower than in the fiber base material 42. If the resin is present at a site P' in the suction medium 46 at a forward position in the running direction of the resin that flows toward an arbitrary site P in the end part 42A of the fiber base material 42 before the position P is impregnated with the resin, the flow of the resin shown by solid lines is blocked. In this case, there is a concern that the site P in the end part 42A is not impregnated with the resin. There is also a concern that the resin (shown by the dashed arrows) flowing through the suction medium 46 spreads in the suction medium 46 and a flow in a reverse direction is generated with respect to the resin flowing through the fiber base material 42 shown by the solid lines.

For suppressing the risk of the non-impregnation caused by the entrance of the resin into the suction medium 46, the resin having entered the suction medium 46 is instantly sucked and removed. Therefore, as shown in FIG. 8A, a resin suction channel 47 for sucking the resin having entered the suction medium 46 is provided on the suction medium 46. The resin suction channel 47 is connected with a vacuum pump by a tube. The resin in the suction medium 46 is sucked through the resin suction channel 47, together with gas. For reliably sucking the resin through the resin suction channel 47, a high-performance vacuum pump is used. The resin suction channel 47 is covered with a film 48, for preventing the resin from flowing from the inner circumference side of the fiber base material 42 into the outer circumference side, detouring the end part 42A (preventing short pass).

Furthermore, for reliably sucking the resin over the whole in the length direction of the suction medium 46, it is necessary to perform the suction from a plurality of spots at a predetermined interval in the length direction of the suction medium 46. Therefore, suction systems (resin suction channels, tubes and pumps) are necessary to the number depending on the length, and the suction systems have a very complicated configuration.

Hence, the inventors of the present invention have conceived the following method, as a method that allows the reduction in the non-impregnation risk caused by the entrance of the resin into the suction medium.

The present invention is a method for producing a fiber-reinforced resin molded article by a molding method of impregnating a fiber base material disposed in a cavity within a mold with a resin by injecting the resin, the cavity being reduced in pressure, the resin being injected by a pressure difference between inside and outside of the cavity, the method for producing the fiber-reinforced resin molded article including: a material disposition step of disposing a suction medium, a resin barrier aeration medium and the fiber base material in the cavity such that the suction medium is positioned between an end part of the fiber base material and the mold and the resin barrier aeration medium is positioned between the suction medium and the end part of the fiber base material, the suction medium communicating with a suction part in the cavity, the suction part being away from an injection part from which the resin is injected into the cavity, the resin barrier aeration medium blocking passing of the resin and securing aeration; an impregnation step of impregnating the fiber base material with the resin by injecting the resin from the injection part, while reducing a pressure in the cavity by suction from the suction part; a curing step of curing the resin with which the fiber base material is impregnated; and a release step of releasing a fiber-reinforced resin in which the fiber base material and the resin are integrated.

In the case of producing a long fiber-reinforced resin molded article, in the material disposition step of the present invention, it is preferable that the suction medium and the resin barrier aeration medium be disposed over the whole in a length direction of the fiber base material, and the suction part be positioned only at one spot or two spots in a length direction of the suction medium.

In the case of producing a long molded article having a bent cross-sectional shape, in the material disposition step of the present invention, it is preferable that the suction medium and the resin barrier aeration medium be disposed at the end part of the fiber base material disposed in a bent cross-sectional shape.

Further, in the case of producing a long molded article having a cross-sectional nearly C-shape, in the material disposition step of the present invention, it is preferable that the suction medium and the resin barrier aeration medium be disposed at each end part on both sides of the fiber base material in a width direction of the fiber base material that is disposed in a cross-sectional nearly C-shape.

In addition, in the material disposition step, it is preferable that an injection channel as the injection part be disposed at a central part of the fiber base material in the width direction.

Furthermore, in the material disposition step, it is preferable that the injection channel be disposed on an inner circumference side of the fiber base material that is disposed in a cross-sectional nearly C-shape, and the suction medium be disposed on an outer circumference side of the end part of the fiber base material.

In the method for producing the fiber-reinforced resin molded article in the present invention, in the impregnation step, it is preferable that the suction be performed from a space between the resin barrier aeration medium containing the suction medium and the mold, using the suction part.

In the method for producing the fiber-reinforced resin molded article in the present invention, in the material disposition step, it is preferable that a clearance between an end part of the resin barrier aeration medium and the mold be sealed.

In the method for producing the fiber-reinforced resin molded article in the present invention, it is preferable that the molded article that is used as a member of an aircraft be produced.

Advantageous Effects of Invention

According to the present invention, since the suction medium is covered with the resin barrier aeration medium, it is possible to reduce the non-impregnation risk caused by the previous flowing of the resin into the suction medium.

Moreover, since the entrance of the resin into the suction medium is blocked by the resin barrier aeration medium, it is possible to realize the decrease in the performance of the pump necessary for the suction and the simplification of the suction system, and therefore, it is possible to reduce costs.

BRIEF DESCRIPTION OF DRAWINGS

In FIG. 4A, the illustration of a bag film and the like is omitted.

FIG. 7 is a diagram showing a modified example of the present invention.

DESCRIPTION OF EMBODIMENTS

Hereinafter, an embodiment of the present invention will be described with reference to the accompanying drawings.

In the embodiment, a molded article (FIG. 1) composed of a fiber-reinforced resin is obtained using a VaRTM (Vacuum assisted Resin Transfer Molding) method.

Figure 1:
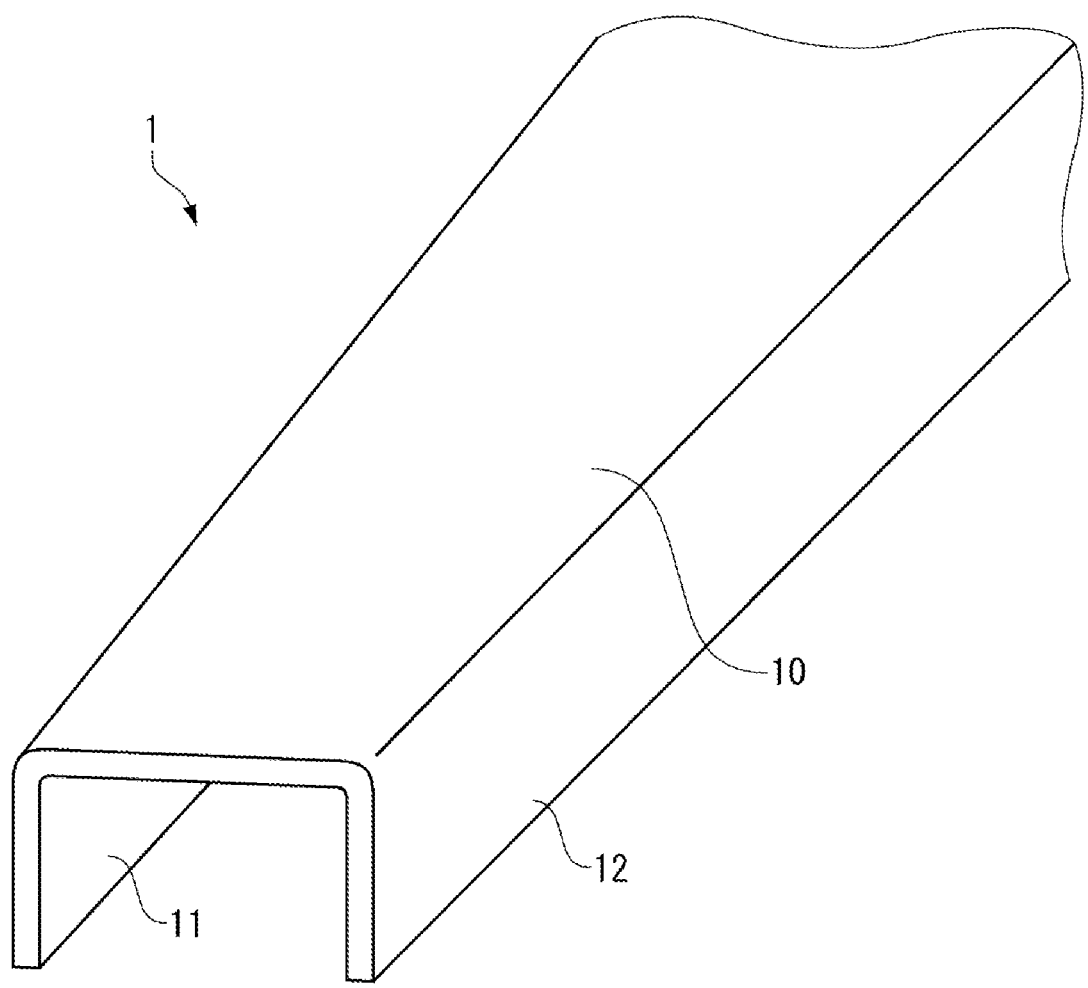
FIG. 1 is a perspective view showing a fiber-reinforced resin molded article that is obtained by a production method according to an embodiment of the present invention.

A molded article 1 shown in FIG. 1 is a long member having a nearly C-shaped transverse section, and is formed in a channel shape as a whole.

The molded article 1 is integrally configured by a web 10 and a pair of flanges 11, 12 each bent in the same direction with respect to the web 10.

Hereinafter, a direction in which an end part of one flange 11 and an end part of the other flange 12 are connected is referred to as a width direction D1.

For example, the molded article 1 can be used as a structural member of a tail unit of an aircraft. The molded article 1 to be used as a beam (spar) that is a structural member of the tail unit is formed such that the width of the web 10 gradually increases from one end side in the length direction to the other end side.

In a fiber-reinforced resin (Fiber-Reinforced Plastics) composing the molded article 1, a fiber base material composed of a reinforcement fiber and a resin is integrated by impregnating the fiber base material with the resin and curing the resin.

The fiber base material is formed of a reinforcement fiber such as a carbon fiber, a glass fiber or an aramid fiber. The fiber base material can be comprised of a single sheet (a fabric or the like) comprising the reinforcement fiber, or by laminating sheets composed of the reinforcement fiber.

As the resin (matrix resin) with which the fiber base material is impregnated, a thermosetting resin such as epoxy, polyimide, polyurethane or unsaturated resin can be used. Alternatively, a thermoplastic resin such as nylon, polyethylene, polystyrene, polyvinyl chloride, PEEK (polyether ether ketone resin) or PES (polyether sulfone resin) can be used.

Figure 2:
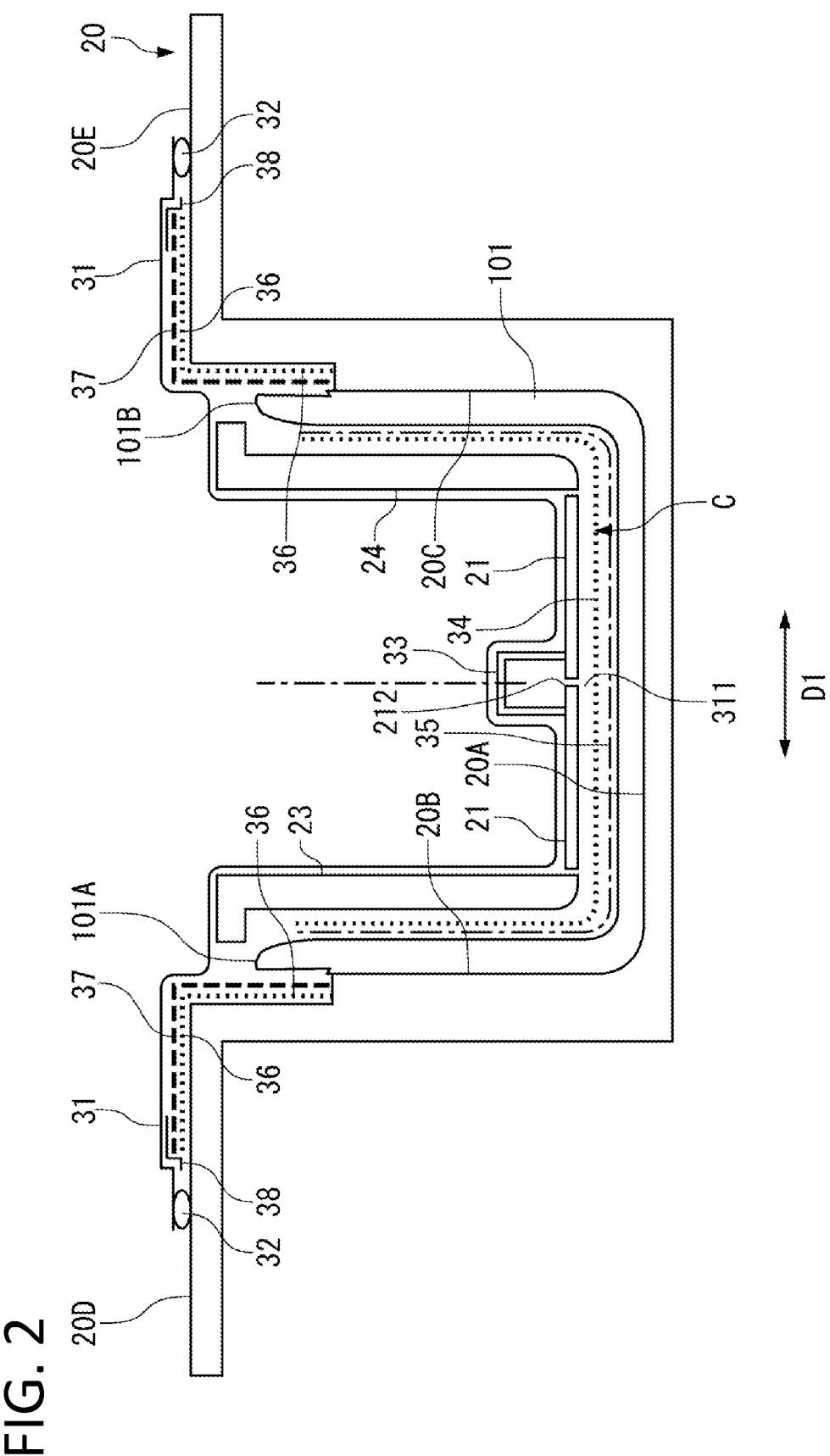
FIG. 2 is a diagram showing a mold and materials that are used for producing the fiber-reinforced resin molded article shown in FIG. 1.

FIG. 2 shows the configuration of a molding apparatus that is used for the production of the molded article 1. With reference to FIG. 2, a mold 20 and various materials that compose the molding apparatus will be described.

In the molding of the molded article 1, the mold 20 in which a fiber base material 101 is disposed, plates 21, 23, 24 that press the fiber base material 101 to the surface of the mold 20, a bag film 31 are used.

The fiber base material 101 is disposed in a cross-sectional nearly C-shape along each of a bottom part 20A of a groove formed in the mold 20 and wall parts 20B, 20C standing from both sides in the width direction D1 of the bottom part 20A.

The fiber base material 101 is, for example, composed of several dozen or more laminated plies. The fiber base material 101 can be disposed in the mold 20, by folding a flat material at each of base ends of the wall parts 20B, 20C. Alternatively, the fiber base material 101 formed with a cross-sectional nearly C-shape in advance can be disposed in the mold 20.

The plates 21, 23, 24 press the fiber base material 101 to the mold 20.

The plate 21 corresponds to a portion disposed at the bottom part 20A of the fiber base material 101. There is a slit-shaped gap 212 positioned at the center of the plate 21 at a central part in the width direction D1 of the bottom part 20A. The gap 212 is continuous in a direction orthogonal to the sheet plane of FIG. 2.

The plate 23 corresponds to a portion disposed at the wall part 20B of the fiber base material 101, and the plate 24 corresponds to a portion disposed at the wall part 20C of the fiber base material 101.

The fiber base material 101, the mold 20 and the plates 21, 23, 24 are symmetrically configured with respect to a center part in the width direction D1 of the bottom part 20A. However, depending on the shape of the molded article 1, without being limited to this, the plates 21, 23, 24 may be asymmetrically configured with respect to the center part.

As the materials that are used for the production of the molded article 1, the bag film 31, a sealant 32, an injection channel 33, a medium 34 (or breather) for dispersing or diffusing the resin, a peel ply 35, a suction medium 36 and a resin barrier aeration medium 37 each will be described. Other than those materials, appropriate materials can be used for the production of the molded article 1.

The bag film 31, with the mold 20, forms a cavity C that is reduced in pressure. The bag film 31, with the mold 20, functions as a mold for molding the fiber-reinforced resin.

Figure 3:
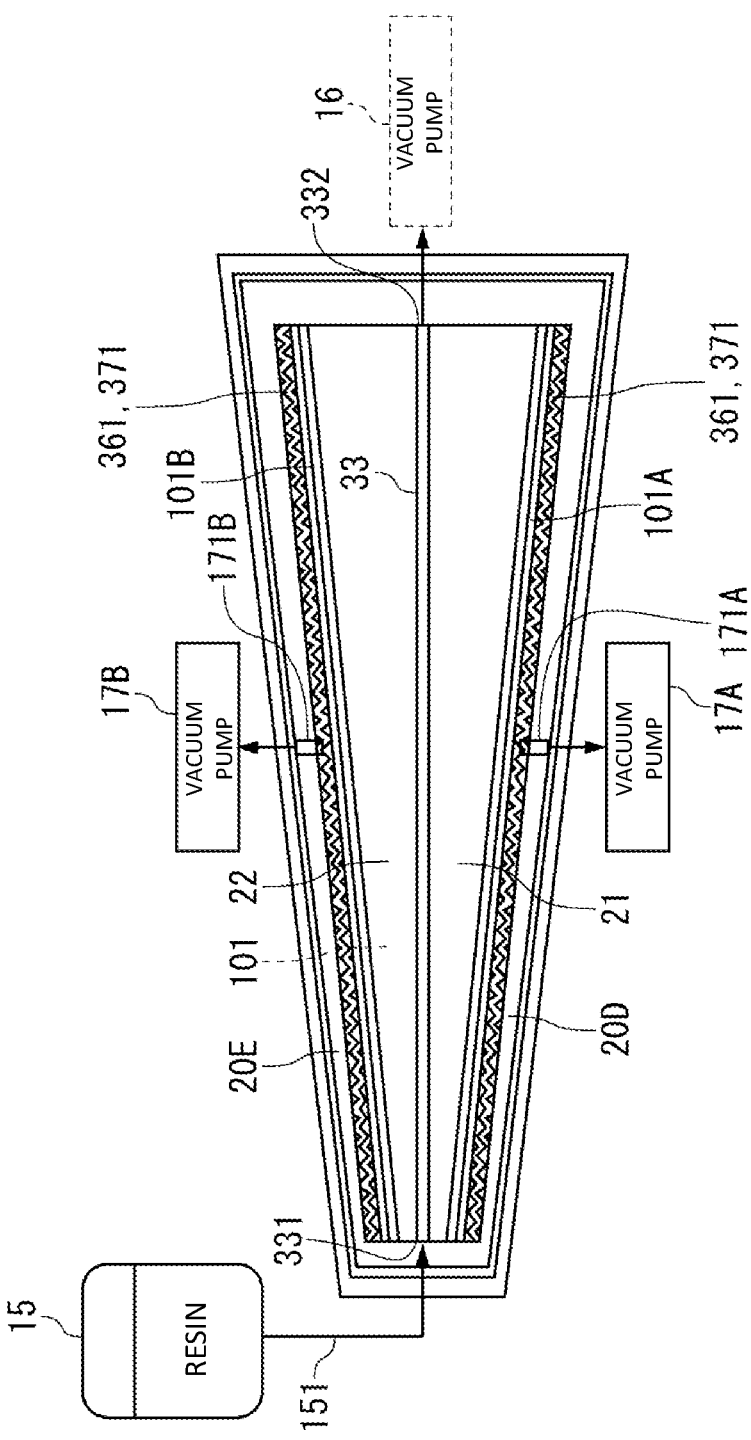
FIG. 3 is a plan view showing the mold and materials shown in FIG. 2, from an upper side.

As shown in FIG. 2 and FIG. 3, the bag film 31 covers the whole of the fiber base material 101 and the plates 21, 23, 24 and a predetermined range of the mold 20 that is positioned around the fiber base material 101. The circularly disposed sealant 32 seals a space between an outer edge part of the bag film and a surface of the mold 20, and thereby, the airtightness in the cavity C is secured.

The C-shaped injection channel 33 is an injection pathway of the resin. As shown in FIG. 2 and FIG. 3, the injection channel 33 is disposed on the plates 21 in an orientation of an inversed U-shape, along the gap 212 between the plates 21. It is preferable that the injection channel 33 extend over the whole in a direction orthogonal to the width direction D1 of the fiber base material 101.

An inlet end part 331 of the injection channel 33 is connected with a supply source 15 of the resin in a liquid form, by an injection path 151 including a tube, a pipe, a valve and the like. For generating a flow of the resin from the inlet end part 331 toward an outlet end part 332, it is preferable that the outlet end part 332 of the injection channel 33 be sucked by a vacuum pump 16. The vacuum pump 16 can be excluded.

The inside of the injection channel 33 communicates with the interior of the cavity C, through the gap 212 and a slit 311 formed on the bag film 31 along the direction orthogonal to the width direction D1.

As shown in FIG. 2, on the inside of the bag film 31, the medium 34 is disposed along an inner circumference part of the fiber base material 101. The medium 34 becomes a pathway of the resin injected from the injection channel 33 into the cavity C, so that the resin is dispersed. The medium 34 corresponds to each of a portion of the fiber base material 101 that is disposed at the bottom part 20A and portions of the fiber base material 101 that are disposed at the wall parts 20B, 20C.

The medium 34 is a mesh-shaped member, fabric, non-woven fabric or the like that has a much lower resistance against the flowing of the resin than the fiber base material 101. Therefore, the resin injected into the cavity C easily flows through the medium 34 in the in-plane direction. The resin is dispersed by the medium 34 in the in-plane direction of the fiber base material 101, and therewith, is pressurized in connection with the pressure reduction in the cavity C, so that the fiber base material 101 is impregnated with the resin.

It is preferable that the peel ply 35 (FIG. 2), which is easily peeled from the fiber base material 101, be interposed between the medium 34 and the fiber base material 101. The peel ply 35 allows the resin to pass. Therefore, the resin flowing through the medium 34 passes through the peel ply 35, so that the fiber base material 101 is impregnated with the resin.

In the case where the medium 34 remains in the molded article 1, the peel ply 35 can be excluded.

For obtaining the long molded article 1 having a cross-sectional nearly C-shape, it is necessary to cause the resin injected into the cavity C to flow in both of the length direction and width direction D1 of the fiber base material 101 and spread over the whole of the fiber base material 101. Particularly, it is difficult to perform the impregnation with the resin of end parts 101A, 101B of the fiber base material 101 that correspond to end parts of the flanges 11, 12 bent with respect to the web 10.

Hence, as the main line of the flow of the resin, the injection channel 33 extending along the length direction is provided at a center part in the width direction D1 on the inner circumference side of the fiber base material 101. Then, the suction (degassing) is performed by vacuum pumps 17A, 17B (FIG. 3), on the outer circumference sides of both end parts 101A, 101B in the width direction D1 of the fiber base material 101 that are away from the center part in the width direction D1. Thereby, it is preferable to generate the flow of the resin that flows through the main line (33) in the length direction and flows from the inner circumference side of the fiber base material 101 to the outer circumference sides of the end parts 101A, 101B.

Here, for leading the injected resin to the end parts 101A, 101B and impregnating portions (outer circumference parts) on the back sides of the end parts 101A, 101B, suction media 36 are disposed on the back sides of the end parts 101A, 101B, respectively, as shown in FIG. 2. For reliably impregnating the end parts 101A, 101B with the resin over the whole in the length direction of the fiber base material 101, it is preferable to dispose the suction media 36 over the whole in the length direction of the fiber base material 101.

Figure 4A:
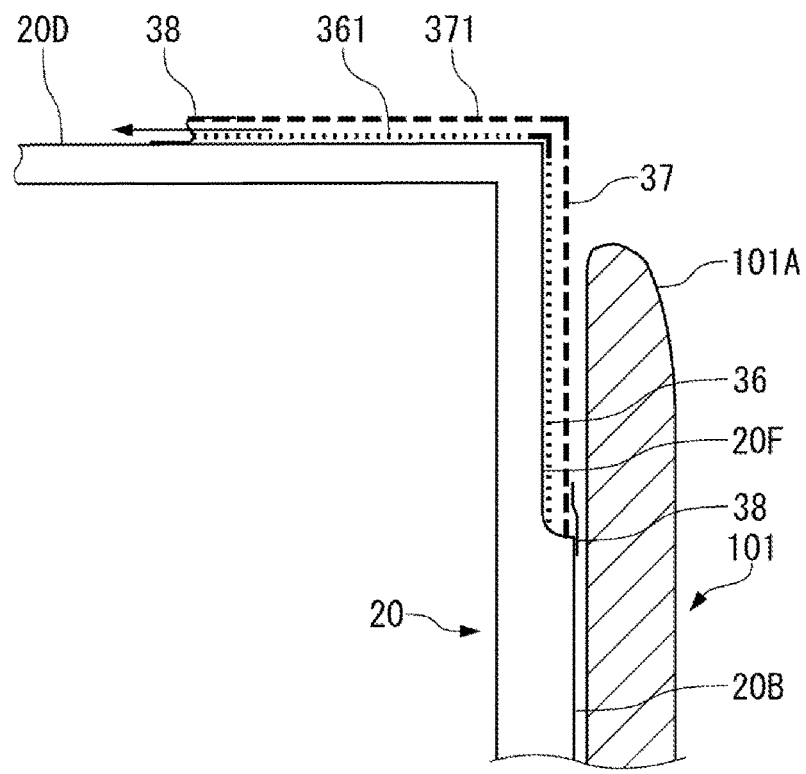
FIG. 4A is a partial enlarged view of FIG. 2.

As shown in FIG. 4A, the suction medium 36 is disposed between the back surface of the end part 101A and the wall part 20B of the mold 20, and communicates with a suction nozzle 171A that is connected with the vacuum pump 17A (FIG. 3).

Similarly, the suction medium 36 is disposed between the wall part 20C (FIG. 2) of the mold 20 and the end part 101B. The suction medium 36 communicates with a suction nozzle 171B that is connected with the vacuum pump 17B (FIG. 3).

Here, openings of the suction nozzles 171A, 171B positioned in the cavity C function as suction parts that communicate with the suction media 36. This is just an example of the suction part. For example, an appropriate valve, an opening part or the like provided in the resin barrier aeration medium 37 and the bag film 31 can be used as the suction part, as long as it functions as a suction port allowing the suction in the cavity C from the exterior.

The suction media 36 secure gas pathways necessary to perform the suction on the back sides of the end parts 101A, 101B.

Similarly to the medium 34, the suction medium 36 is a mesh-shaped member, fabric, non-woven fabric or the like, and has a much lower resistance against the flowing of the resin than the fiber base material 101. Therefore, the resin having entered the suction medium 36 easily flows.

The embodiment is characterized mainly by disposing the suction media 36 and the resin barrier aeration media 37 between the end parts 101A, 101B, which are difficult to be impregnated with the injected resin, and the mold 20.

The resin barrier aeration media 37 (FIG. 2 and FIGS. 4A to 4C) are disposed at the interval between the end part 101A and the suction medium 36 and at the interval between the end part 101B and the suction medium 36, respectively.

The resin barrier aeration media 37 secure an aeration property necessary to block the passing of the resin and suck the resin from the suction nozzles 171A, 171B through the suction media 36. As the resin barrier aeration medium 37, a membrane having an opening that is smaller than molecules of the resin in a liquid form and is larger than molecules of the air in the cavity C and the gas volatilized from the resin can be used. As the resin barrier aeration medium 37, it is preferable to use a medium in which such a membrane and a supporting layer and protecting layer for the membrane are laminated.

If a step 20F is formed on the wall part 20B, the suction medium 36 and the resin barrier aeration medium 37 can be disposed on the inside of the step 20F. Alternatively, the suction medium 36 and the resin barrier aeration medium 37 can be disposed along a flat wall part 20C.

As the resin barrier aeration medium 37, it is possible to use any medium that allows gas to pass but allows the resin not to pass, as exemplified by a base material in which a microporous sheet, resin film, paper, cloth or the like is coated with a microporous membrane. Further, when the resin barrier aeration medium 37 has smoothness of the surface, it is possible to increase the surface quality of the molded article. Further, it is desirable for the resin barrier aeration medium 37 to have a release property. Depending on circumstances, however, the resin barrier aeration medium 37 may be integrated with the molded article 1.

Gas can pass through the resin barrier aeration medium 37 in the thickness direction. However, the resin barrier aeration medium 37 has a denser composition than the suction medium 36, and therefore, if the suction medium 36 does not exist, the resin barrier aeration medium 37 tightly contacts with the surface of the mold 20. In that case, the aeration property of the resin barrier aeration medium 37 is not exerted, and it is not possible to secure the aeration between the back sides of the end parts 101A, 101B and the suction nozzles 171A, 171B. Therefore, it is not possible to perform the suction from the back sides of the end parts 101A, 101B.

Since the suction medium 36 has a coarser composition than the resin barrier aeration medium 37, the suction medium 36 contacts with the mold 20 but does not tightly contact, and secures the aeration from the end parts 101A, 101B to the suction nozzles 171A, 171B.

That is, it is possible to secure the aeration necessary to perform the suction from the back sides of the end parts 101A, 101B through the suction media 36, not by only the resin barrier aeration media 37 but by laminating the resin barrier aeration media 37 on the suction media 36 disposed on the mold 20. Further, it is possible to prevent the injected resin from entering the suction media 36 with the resin barrier aeration media 37, by laminating the resin barrier aeration media 37 on the suction media 36. As described with reference to FIG. 8B, the resin flow resistance of the suction medium 36 is low. Therefore, even when the resin enters a part of the suction medium 36, there is a possibility that the resin flows around to the site P' in the suction medium 36 at a forward position in the running direction of the resin that flows toward an arbitrary site (for example, P) in the end parts 101A, 101B of the fiber base material 101 before the resin reaches the site P. The suction medium 36 is wholly covered with the resin barrier aeration medium 37 for avoiding the obstruction of the impregnation of the site P with the resin and the generation of a non-impregnated region U due to the previous flowing of the resin.

The inflow of the resin into the suction media 36 is blocked by the resin barrier aeration media 37. Therefore, the required suction performance of the vacuum pumps 17A, 17B that perform the suction from the suction nozzles 171A, 171B through the suction media 36 is lower compared to the case where the resin directly enters the suction media 36 from the fiber base material 101 without passing through the resin barrier aeration media 37. Therefore, the structure necessary to perform the suction through the suction media 36 is simplified compared to the reference example shown in FIG. 8A.

Figure 4B:
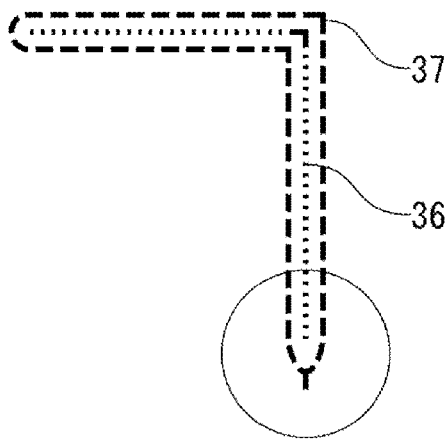
FIG. 4B is a modified example of a resin barrier aeration medium.
Figure 4C:
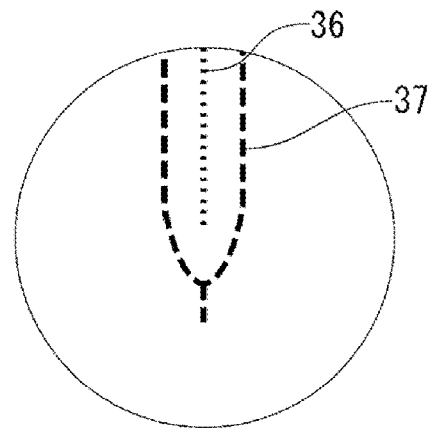
FIG. 4C is a further modified example of FIG. 4B.

The resin barrier aeration medium 37 may have a tube-shaped structure shown in FIG. 4B. Further, as shown in FIG. 4C, an end part of the resin barrier aeration medium 37 having a tube-shaped structure may be processed by heat seaming.

The configuration about the suction through the suction medium 36 will be described below.

As shown in FIG. 4A, the suction medium 36 extends from the wall part 20B of the mold 20 along a bank 20D of the mold 20 on which the suction nozzle 171A is provided. As shown in FIG. 3, the suction nozzle 171A is disposed at a predetermined spot on a region 361 of the suction medium 36 disposed on the bank 20D.

Similarly to the suction medium 36, the resin barrier aeration medium 37 extends from the wall part 20B of the mold 20 along the bank 20D of the mold 20 on which the suction nozzle 171A is provided. A region 371 of the resin barrier aeration medium 37 disposed on the bank 20D is disposed on the suction nozzle 171A. That is, the suction nozzle 171A is sandwiched between the resin barrier aeration medium 37 and the suction medium 36.

Since the inflow of the resin is prevented by the resin barrier aeration medium 37, it is possible to suck only gas through the suction nozzle 171A with the vacuum pump 17A. The clearance between the mold 20 and the end part of the resin barrier aeration medium 37 is sealed by a tape 38 (FIG. 4A) or the like that fixes the end part of the resin barrier aeration medium 37 along the length direction. In that case, it is possible to efficiently perform the suction by the suction nozzle 171A from a long and thin space between the resin barrier aeration medium 37 containing the suction medium 36 and the mold 20.

The suction nozzle 171A does not always need to be disposed on the suction medium 36, and may be disposed under the suction medium 36. The position of the suction nozzle 171A does not matter as long as the suction nozzle 171A communicates with the suction medium 36 and the suction can be performed from the suction nozzle 171A through the suction medium 36.

Similarly, the suction medium 36 and resin barrier aeration medium 37 disposed on the wall part 20C (FIG. 2) of the mold 20 extend along a bank 20E (FIG. 2) of the mold 20. The suction medium 36, the suction nozzle 171B and the resin barrier aeration medium 37 are disposed on the bank 20E.

In the embodiment, pumps are prepared individually for the suction nozzles 171A, 171B. As shown in FIG. 3, the vacuum pump 17A is connected with the suction nozzle 171A, and the vacuum pump 17B is connected with the suction nozzle 171B. The suction nozzle 171A and the suction nozzle 171B may be connected with an identical pump.

The suction nozzle 171A is disposed at one spot in the length direction of the suction medium 36. In the same manner, the suction nozzle 171B is also disposed at one spot in the length direction of the suction medium 36.

The suction nozzles 171A, 171B may be disposed at end parts in the length direction of the suction media 36. In the case where the suction nozzles 171A, 171B are disposed at one end parts in the length direction of the suction media 36, the suction ports of the nozzles may be oriented to the other end parts.

In FIGS. 4A to 4C (in the embodiment), it is only necessary to suck only gas through the suction media 36 with the pumps 17A, 17B that have a lower suction performance than pumps to be used when the resin is sucked. Therefore, it is not necessary to provide the resin suction channel 47 and the film 48 for preventing short pass shown in FIG. 8A, and it is not necessary to perform the division into a plurality of suction systems in the length direction.

Figure 8A:
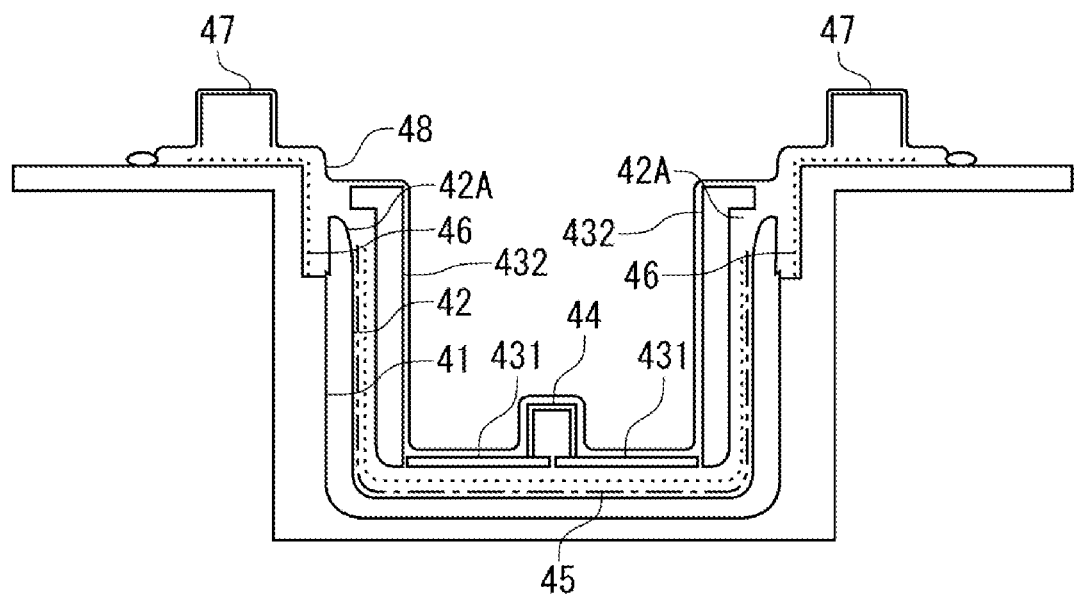
FIG. 8A is a diagram showing an example of a mold and materials that are used for producing a fiber-reinforced resin molded article.
Figure 8B:
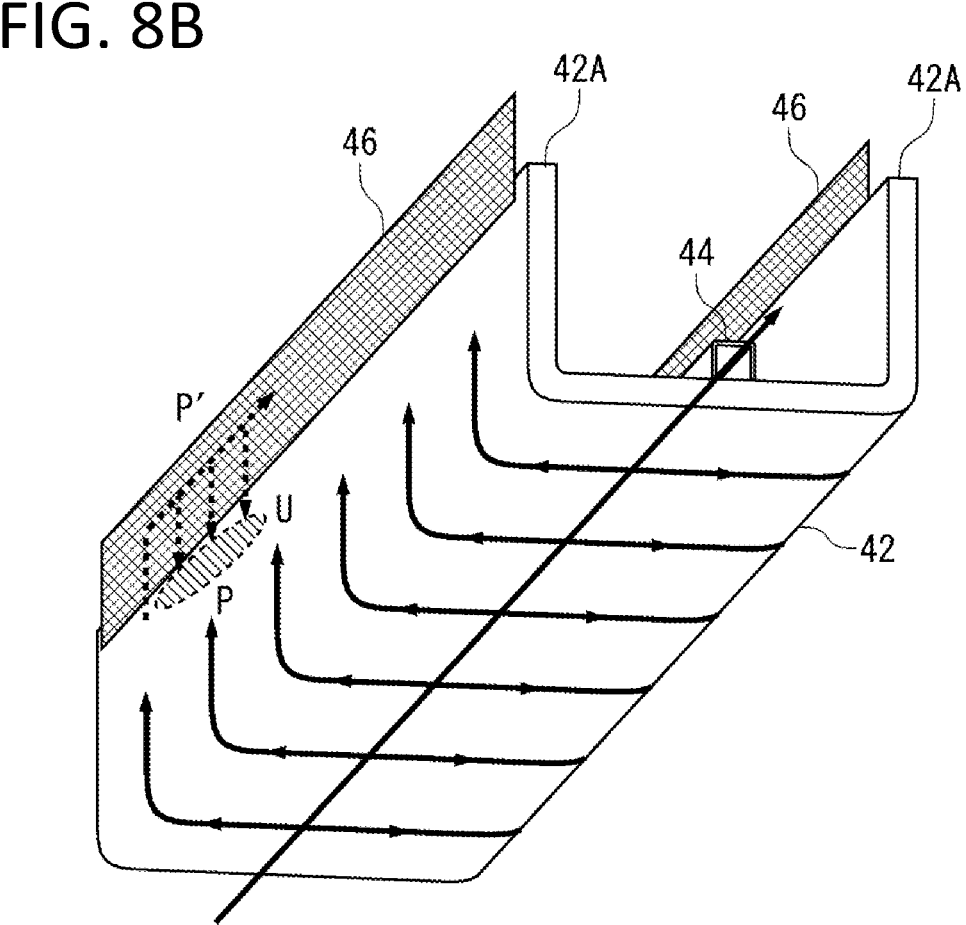
FIG. 8B is a diagram showing a phenomenon (previous flowing) in which a resin flows through a suction medium before an end part of a fiber base material is impregnated with the resin.

Therefore, according to the embodiment, unlike the reference example shown in FIG. 8A and FIG. 8B, the suction system is not complicated by the resin suction channel 47 and tube for each system, and thus the structure of the suction system can be simplified. According to the embodiment, it is possible to perform a considerable cost reduction due to the simplification of the material structure necessary for the suction, in addition to a cost reduction due to the decrease in the necessary performance of the pumps 17A, 17B.

It is allowable to dispose suction nozzles 171A at several spots in the length direction of the suction medium 36, as backups. The plurality of suction nozzles 171A can be connected with an identical pump 17A. Similarly, it is allowable to dispose suction nozzles 171B at several spots in the length direction of the suction medium 36, as backups.

Figure 5:
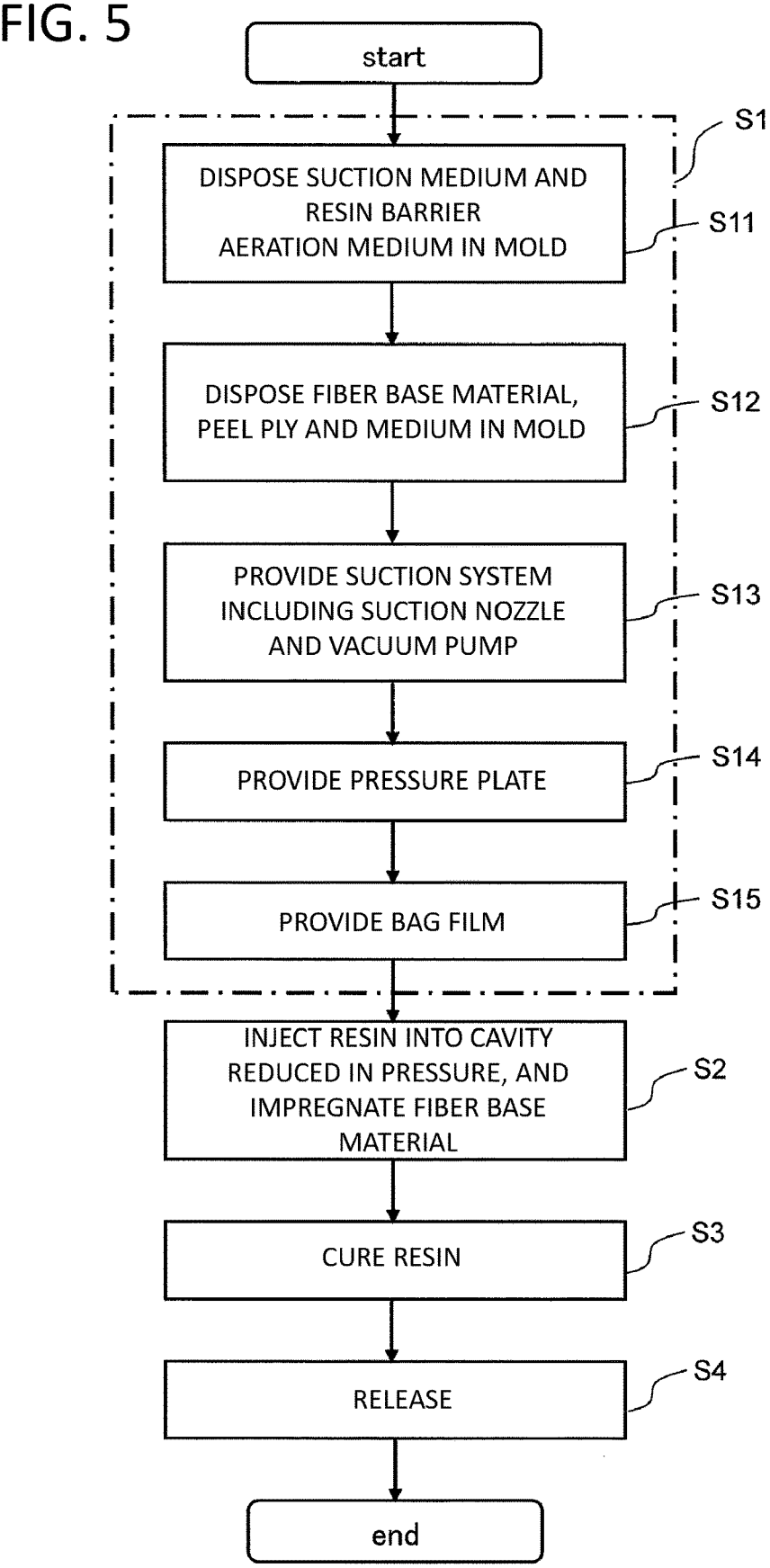
FIG. 5 is a diagram showing a procedure of a method for producing a fiber-reinforced resin molded article.

An exemplary procedure (FIG. 5) of the production method for obtaining the molded article 1 will be described below.

First, the materials to be used for the production are disposed in the mold 20 (material disposition step S1). In the following, an exemplary procedure for disposing the materials will be described. The order of the disposition of the materials does not matter particularly.

Here, the suction medium 36 is provided along the wall part 20B and the bank 20D (FIG. 2) of the mold 20, and the resin barrier aeration medium 37 is laid thereon (step S11). In this state, a lower end of the resin barrier aeration medium 37 is fixed on the wall part 20B by the tape 38 or the like.

Next, the fiber base material 101 is disposed in a cross-sectional nearly C-shape on the inside of the mold 20, and the peel ply 35 and the medium 34 are laminated on the inner circumference part of the fiber base material 101 (step S12). The fiber base material 101 may be in advance disposed in the mold 20, and thereafter, the suction media 36 and the resin barrier aeration media 37 may be inserted between the fiber base material 101 and the wall parts 20B, 20C of the mold 20. The order of step S11 and step S12 may be changed.

Further, the suction system including the suction nozzles 171A, 171B and the vacuum pumps 17A, 17B is provided (step S13). The suction nozzle 171A (FIG. 3) is disposed between the suction medium 36 and resin barrier aeration medium 37 disposed on the bank 20D, and then, the resin barrier aeration medium 37 is fixed on the bank 20D by the tape 38 or the like. Similarly, the suction nozzle 171B (FIG. 3) is disposed between the suction medium 36 and resin barrier aeration medium 37 disposed on the bank 20E. Since the structure of the suction system is simple, the suction system can be easily provided.

Subsequently, the fiber base material 101 is pressed to the mold 20 through the bag film 31 by the plates 21, 23, 24 (step S14).

Then, the fiber base material 101, the plates 21, 23, 24, and the whole of the suction media 36 and the resin barrier aeration media 37 are covered with the bag film 31 (FIG. 2, FIG. 3), and the clearance between the outer circumference part of the bag film 31 and the mold 20 is sealed by the sealant 32 (step S15). The cavity C that is reduced in pressure is formed between the bag film 31 and the mold 20. The fiber base material 101, the plates 21, 23, 24, the suction media 36 and the resin barrier aeration media 37 are disposed in the cavity C.

Next, the injection channel 33 is disposed along the gap 212 between the plates 21, and the injection channel 33 is connected with the resin supply source 15 by the tube and the pipe (the injection path 151).

In this way, the disposition of the materials is completed, and then, the vacuum pumps 17A, 17B are actuated, so that the suction is started. Then, when the pressure in the cavity C is reduced to a predetermined vacuum degree, the injection of the resin is started, so that the fiber base material 101 is impregnated with the resin (impregnation step S2). The resin can be supplied from the resin supply source 15 to the injection channel 33, by opening an unillustrated valve provided on the injection path 151. While flowing through the injection channel 33, the resin is injected from the injection channel 33 into the cavity C that is reduced in pressure relative to the atmosphere.

It is preferable to perform the suction by the pumps 17A, 17B, in the impregnation step S2 and the subsequent curing step S3.

In the case where a thermoplastic resin is used as the matrix resin, the impregnation step S2 is performed under a heat atmosphere.

Figure 6:
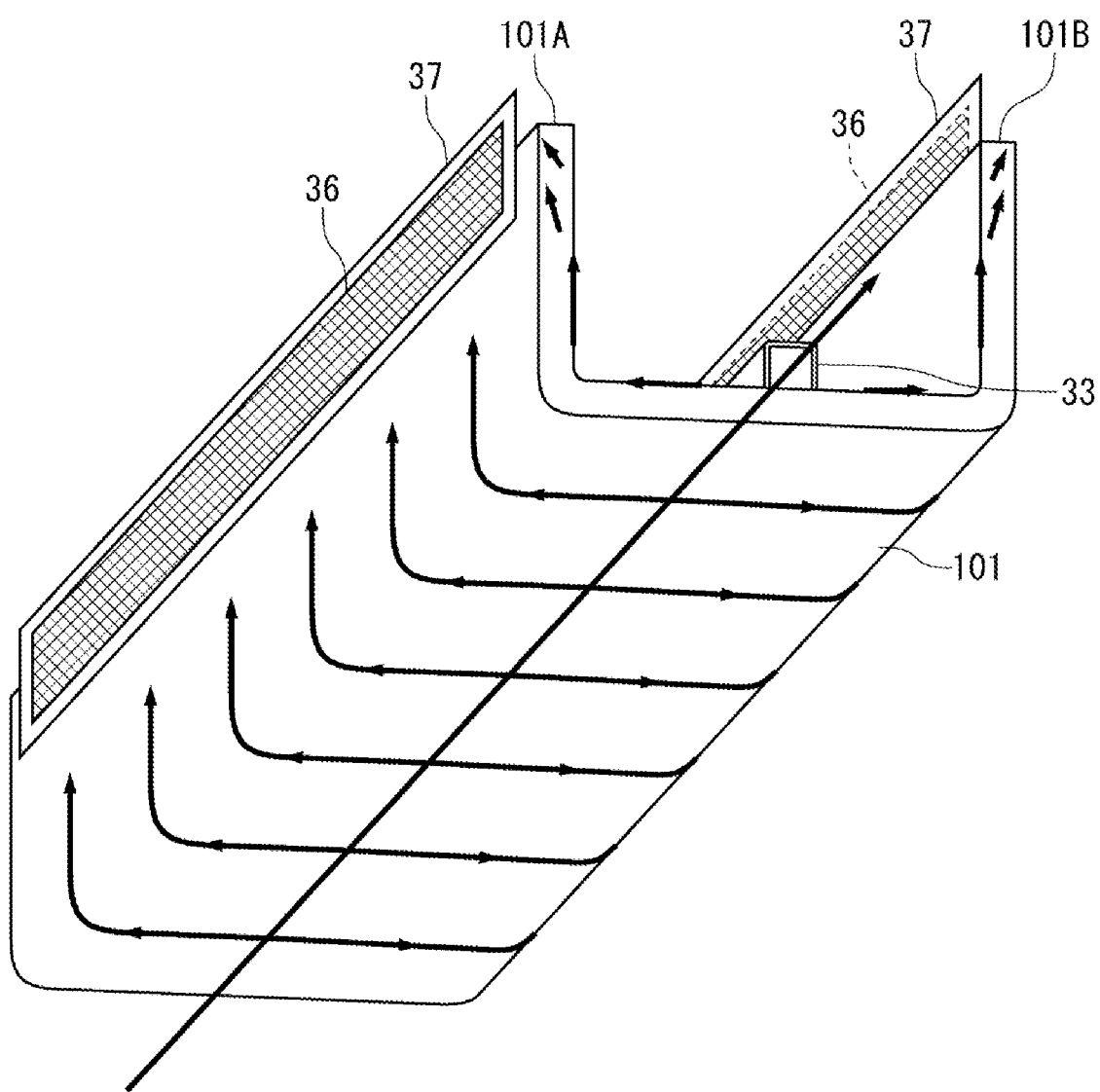
FIG. 6 is a diagram for describing the action of a suction medium and a resin barrier aeration medium.

FIG. 6 schematically shows a flowing manner of the resin in the cavity C, by arrows. The resin flows through the injection channel 33 in the length direction, enters the cavity C, spreads through the medium 34 (FIG. 2) also in the width direction D1, and flows toward the end parts 101A, 101B where the suction media 36 are positioned. In the process, the fiber base material 101 is impregnated with the resin.

Here, the entrance of the resin into the suction media 36 is blocked by the resin barrier aeration media 37. Therefore, the phenomenon of the previous flowing in which the resin flows through the suction media 36 in the length direction at a higher speed than a speed at which the end parts 101A, 101B are impregnated with the resin does not occur.

Therefore, the non-impregnated region does not remain at the end parts 101A, 101B, and it is possible to uniformly impregnate the whole of the fiber base material 101 with the resin (so far, the impregnation step S2).

Next, the resin with which the fiber base material 101 is impregnated is cured (curing step S3). In the case where a thermosetting resin is used as the matrix resin, the resin is cured by heating the fiber base material 101 impregnated with the resin. In the case where a thermoplastic resin is used as the matrix resin, it is possible to wait for the curing of the resin at normal temperature.

As the heating method, for example, the fiber base material 101 impregnated with the resin is put in an oven, in a state of being disposed in the mold 20, and is heated. Alternatively, the resin may be cured by heating the resin using a heater mat, a dryer or the like.

It is possible to suck the gas volatilized from the resin during the curing, by actuating the pumps 17A, 17B during the curing. Thereby, it is possible to prevent the generation of voids. Further, the fiber base material 101 is sufficiently compressed, and is densified.

By curing the resin, a fiber-reinforced resin in which the resin and the fiber base material 101 are integrated is molded. Finally, it is possible to obtain a molded article composed of the fiber-reinforced resin by releasing the molded article from the mold 20 (release step S4).

According to the production method in the embodiment described above, by using the resin barrier aeration medium 37 covering the suction medium 36, it is possible to reduce the risk of the non-impregnation caused by the previous flowing of the resin through the suction medium 36.

Furthermore, since the inflow of the resin into the suction medium 36 is blocked by the resin barrier aeration medium 37, the complicated configuration for removing the resin having entered the suction medium 36 is unnecessary. Thereby, a considerable cost reduction can be realized.

Other than the above description, without departing from the spirit of the present invention, the configurations mentioned in the above embodiment can be selectively adopted, and can be appropriately modified to other configurations.

In the above embodiment, the injection channel 33 is disposed on the inner circumference side of the fiber base material 101 disposed in a cross-sectional nearly C-shape, and the suction medium 36 is disposed at the outer circumference part of the fiber base material 101. However, the reverse configuration may be adopted. For example, as shown in FIG. 7, on an upward convex mold 20 having a cross-sectional rectangular shape, in the order from bottom, the fiber base material 101, the peel ply 35, the medium 34 and the plate 21 are laminated and disposed. In this case, the injection channel 33 is disposed at a central part of the plate 21, and the whole is covered with the bag film 31 from the outside of them. Further, the interval between the outer edge part of the bag film 31 and the mold 20 is sealed by the sealant 32. Further, the suction media 36 and the resin barrier aeration media 37 each are disposed on the inner circumference sides of end parts of the fiber base material 101. End parts of the suction media 36 and the resin barrier aeration media 37 are fixed along the length direction by tapes 38. End parts of the suction media 36 on the upper side in the figure may be also covered with tapes 38 along the length direction.

Then, while the suction is performed at the end parts of the fiber base material 101 from the inner circumference sides of the mold 20 through the suction media 36 and the resin barrier aeration media 37, the resin is injected from the injection channel 33 (groove) positioned at the central part on the upper surface of the fiber base material 101. Thereby, it is possible to sufficiently impregnate the end parts of the fiber base material 101 with the injected resin.

The shape of the molded article to be produced by the present invention is not limited to the cross-sectional nearly C-shape, and the present invention can be applied to molded articles having a tabular shape, a cross-sectional L-shape and other various shapes. Particularly, the present invention has an advantage in the production of molded articles having bent shapes such as a cross-sectional L-shape and a cross-sectional nearly C-shape. This is because in the case of such shapes, it is hard for the resin to flow to a portion that is bent with respect to a flat portion where the injection part is set. The suction medium 36 and the resin barrier aeration medium 37 may be disposed at an end part of a bent portion that the resin does not easily reach.

When there is a risk of the non-impregnation caused by the previous flowing in which the resin enters the suction medium 36 in a configuration in which the suction medium 36 is disposed and the suction is performed from the suction part because the impregnation is difficult, for example, at an end part of a bent portion or the like, regardless of the shape of the molded article, the present invention can be applied for reducing the non-impregnation risk.

REFERENCE SIGNS LIST 1 molded article
10 web
11, 12 flange
15 resin supply source
16 vacuum pump
17A, 17B vacuum pump
20 mold
20A bottom part
20B, 20C wall part
20D, 20E bank
20F step
21, 23, 24 plate
31 bag film
32 sealant
33 injection channel (injection part)
34 medium
35 peel ply
36 suction medium
37 resin barrier aeration medium
38 tape
41 mold
42 fiber base material
42A end part
44 injection channel
45 medium
46 suction medium
47 resin suction channel
48 film
101 fiber base material
101A, 101B end part
151 injection path
171A, 171B suction nozzle (suction part)
212 gap
311 slit
331 inlet end part
332 outlet end part
361 region
371 region
431, 432 plate
C cavity
D1 width direction
P site
S1 material disposition step
S2 impregnation step
S3 curing step
S4 release step
U non-impregnated region

The invention claimed is:

1. A method for producing a fiber-reinforced resin molded article by a molding method of impregnating a fiber base material disposed in a cavity within a mold with a resin by injecting the resin, the cavity being reduced in pressure, the resin being injected by a pressure difference between inside and outside of the cavity, the method for producing the fiber-reinforced resin molded article comprising:
  a material disposition step of disposing a suction medium, a resin barrier aeration medium and the fiber base material in the cavity such that the suction medium is positioned between an end part of the fiber base material and the mold and the resin barrier aeration medium is positioned between the suction medium and the end part of the fiber base material, the suction medium communicating with a suction part in the cavity, the suction part being away from an injection part from which the resin is injected into the cavity, the resin barrier aeration medium blocking passing of the resin and securing aeration;
  an impregnation step of impregnating the fiber base material with the resin by injecting the resin from the injection part, while reducing a pressure in the cavity by suction from the suction part;
  a curing step of curing the resin with which the fiber base material is impregnated; and
  a release step of releasing a fiber-reinforced resin in which the fiber base material and the resin are integrated,
  wherein, in the material disposition step:
    the suction medium is disposed only at the end part of the fiber base material between the fiber base material and the mold; and
    the resin barrier aeration medium is disposed only at the end part of the fiber base material between the suction medium and the fiber base material.

2. The method for producing the fiber-reinforced resin molded article according to claim 1, wherein
  the method for producing the fiber-reinforced resin molded article is a method for producing a long molded article, and
  in the material disposition step,
  the suction medium and the resin barrier aeration medium are disposed over the whole in a length direction of the fiber base material, and the suction part is positioned only at one spot or two spots in a length direction of the suction medium.

3. The method for producing the fiber-reinforced resin molded article according to claim 2, wherein
  the method for producing the fiber-reinforced resin molded article is a method for producing a long molded article having a bent cross-sectional shape, and
  in the material disposition step,
  the suction medium and the resin barrier aeration medium are disposed at the end part of the fiber base material disposed in a bent cross-sectional shape.

4. The method for producing the fiber-reinforced resin molded article according to claim 3, wherein the end part of the fiber base material is positioned away from a bent part of the fiber base material.

5. The method for producing the fiber-reinforced resin molded article according to claim 3, wherein
  the method for producing the fiber-reinforced resin molded article is a method for producing a long molded article having a cross-sectional nearly C-shape, and
  in the material disposition step,
  the suction medium and the resin barrier aeration medium are disposed at each end part on both sides of the fiber base material in a width direction of the fiber base material that is disposed in a cross-sectional nearly C-shape.

6. The method for producing the fiber-reinforced resin molded article according to claim 5, wherein
  in the material disposition step,
  an injection channel as the injection part is disposed at a central part of the fiber base material in the width direction.

7. The method for producing the fiber-reinforced resin molded article according to claim 6, wherein
  in the material disposition step,
  the injection channel is disposed on an inner circumference side of the fiber base material that is disposed in a cross-sectional nearly C-shape, and the suction medium is disposed on an outer circumference side of the end part of the fiber base material.

8. The method for producing the fiber-reinforced resin molded article according to claim 2, wherein
the method for producing the fiber-reinforced resin molded article is a method for producing a long molded article having a cross-sectional nearly C-shape, and
in the material disposition step,
the suction medium and the resin barrier aeration medium are disposed at each end part on both sides of the fiber base material in a width direction of the fiber base material that is disposed in a cross-sectional nearly C-shape.

9. The method for producing the fiber-reinforced resin molded article according to claim 8, wherein the end part of the fiber base material is positioned away from a bent part of the fiber base material.

10. The method for producing the fiber-reinforced resin molded article according to claim 8, wherein
in the material disposition step,
an injection channel as the injection part is disposed at a central part of the fiber base material in the width direction.

11. The method for producing the fiber-reinforced resin molded article according to claim 10, wherein
in the material disposition step,
the injection channel is disposed on an inner circumference side of the fiber base material that is disposed in a cross-sectional nearly C-shape, and the suction medium is disposed on an outer circumference side of the end part of the fiber base material.

12. The method for producing the fiber-reinforced resin molded article according to claim 1, wherein
in the impregnation step,
the suction is performed from a space between the resin barrier aeration medium containing the suction medium and the mold, using the suction part.

13. The method for producing the fiber-reinforced resin molded article according to claim 12, wherein
in the material disposition step,
a clearance between an end part of the resin barrier aeration medium and the mold is sealed.

14. The method for producing the fiber-reinforced resin molded article according to claim 1, wherein the molded article that is used as a member of an aircraft is produced.

* * * * *